May 30, 1933. C. STAUFERT 1,911,329

SPINDLE FITTED WITH ROLLER OR BALL BEARINGS

Original Filed April 11, 1928 2 Sheets-Sheet 1

INVENTOR.
Carl Staufert
By William C. Linton
Atty.

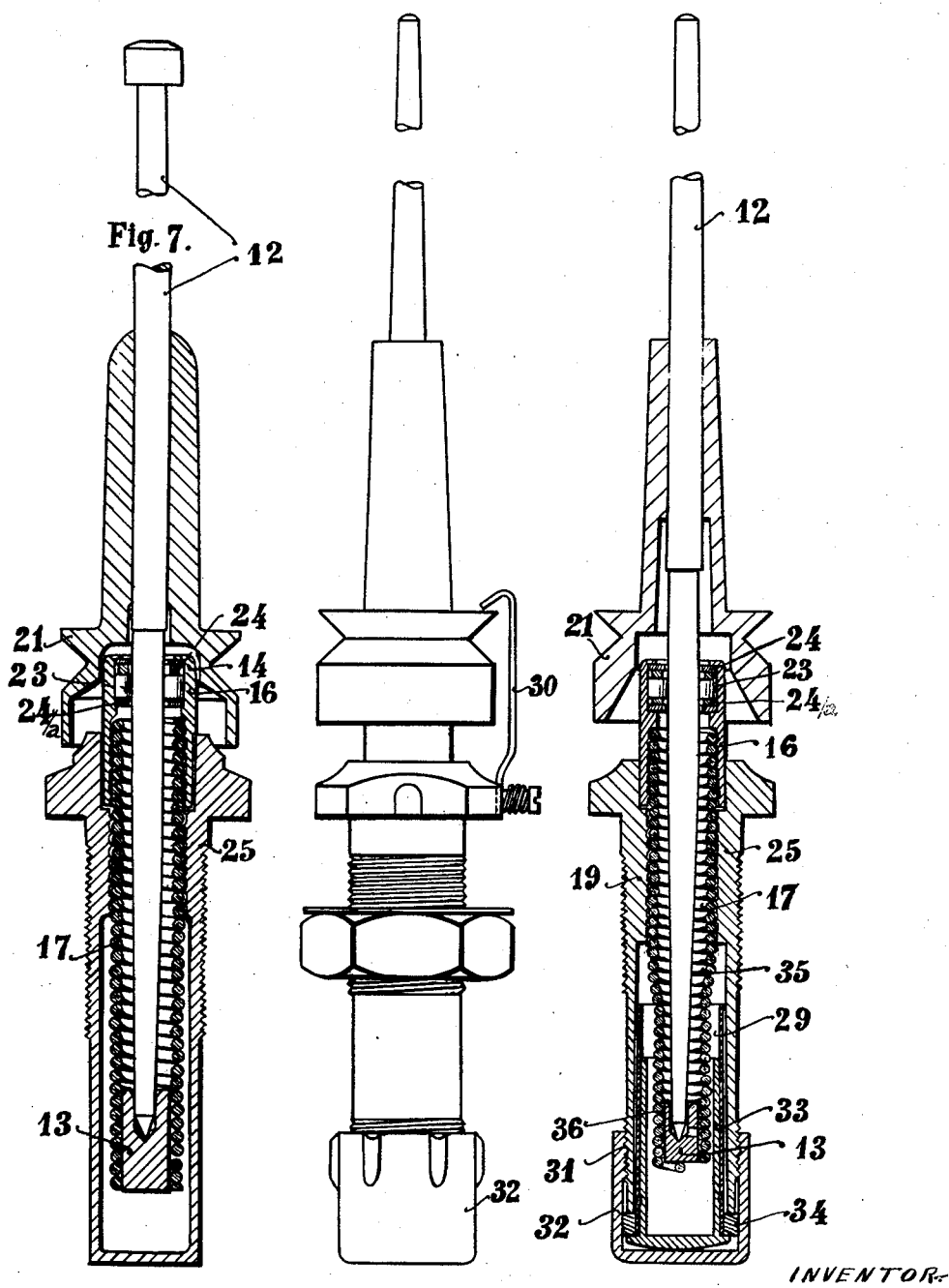

Patented May 30, 1933

1,911,329

UNITED STATES PATENT OFFICE

CARL STAUFERT, OF STUTTGART-CANNSTATT, GERMANY

SPINDLE FITTED WITH ROLLER OR BALL BEARINGS

Application filed April 11, 1928, Serial No. 269,240, and in Germany April 12, 1927. Renewed November 21, 1932.

Figure 1:
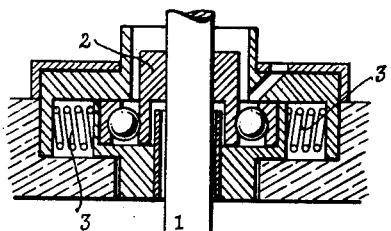

The object of the present application concerns a spindle for spinning machines and twisters. As it is known, collars of this kind of spindles are mostly shaped in form of slide-, ball- or roller-bearings. The disadvantages of spindles provided with slide-bearings, i. e. the requirement of increased driving-power and the increased consumption of lubricating material should be eliminated by the use of spindles mounted on ball-bearings. The result was, that spindles fitted with ball-bearings present still more disadvantages, e. g. the balls lose with the time their sphericity and become angular, so that detriments, which ought to have been avoided by the use of ball-bearings, have really increased. It is well known, that very narrow relations exist between the speed, with which a spindle is revolving, and its own-weight and the weight of the yarn. If any disturbances occur between these relations, the spindle will vibrate. The vibrations of the spindle are very disadvantageous for the yarn and in many cases, on account of the vibrations, there is no possibility to produce thread. According to Fig. 1 this has been till now avoided by arranging the ball-cage 2, by which spindle 1 is surrounded, flexible in the plane of the bearing and this was reached by means of springs 3 inserted all around. Even by the arrangement the fault cannot be eliminated.

Figure 2:
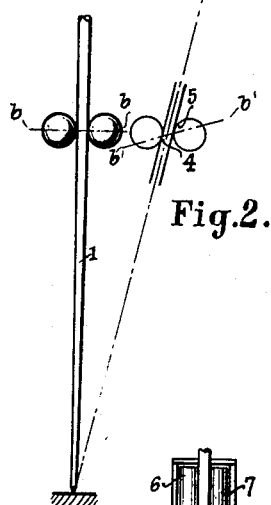

Fig. 2 shows on a magnified scale, why the possibility of shifting the bearing in a horizontal plane cannot contribute to the elimination of the fault. In its original position the plane of contact ($b$—$b$) of the balls stays upright to the shaft and, as the strains eliminate themselves, the spindle will steadily revolve. It is a well known thing, that the axis of the spindle, as soon as the critical speed is reached, will laterally deflect to an amount going theoretically from plus infinite to minus infinite. As the spindle is guided by its bearing, amplitudes of infinite value would never be reached, but at any rate a shifting of the spindle bearing will result, which shifting causes the displacement of the plane of the balls. The plane of contact ($b'$—$b'$) will no longer intersect the axis of the spindle at a right angle, but it will approach the plane, in which the spindle is revolving. The points of contact 4 and 5 of the balls lie at different heights. The balls will act upon arms of lever of different lengths, thus causing the vibrating of the spindle.

To prevent these evils, rollers 6 and 7 are used instead of balls. By this means a braking action is effected upon the spindles, when the latter is revolving at the critical speed.

The oscillations will present knots beneath the spindle-collar. The spindle will vibrate. If the bearing is allowed to be laterally displaced under the action of springs, these detriments will in no way be eliminated, because, when the spindle would vibrate round its axis, the reciprocal distance $a$ between opposite rollers would increase to $a'$. At the same time the above mentioned evils, which had occurred in the case of ball-bearings and which were caused by the horizontal displacement of the bearing, will re-appear, if roller-bearings would be applied.

Figure 4:
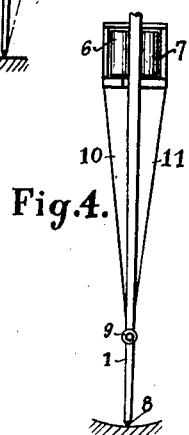

From all this it may result, that the horizontal displacement of the spindle collar would only be successful and would lead to a solution, if, at a shifting of the bearing, the points of contact between rollers or balls on one side and spindle on the other side would never change their plane in regard to the axis of the spindle. In other words the plane of the bearing has always to intersect that of the spindle-axis at a right angle. Because of the own oscillation of the spindle, of the amplitude occurring at the critical speed and of the displacement effected by the moment of gyration, the spindle cannot be regarded as a pendulum since it would oscillate around the fixed supporting point 8. According to the dimensions of the spindle, the centre of oscillation 19 will rise or descend (Fig. 4). Besides, it is to be remarked, that supporting point 8 describes a short curve when moving, so that no large possibility of displacement must be given to it.

The displacement of the spindle bearing— of the bolster—effected by the action of the driving-band has been taken into account till now by providing a spring acting only in one direction. Other forces acting in other directions had no yielding bearing and, owing to the continuous action of these forces, permanent deformations of the spindle occur. Such forces are generated e. g. by exerting a braking action on the spindle, by doffing the full bobbins and by creeling the new ones.

Besides, the precise centering of the spindle collar and of the footstep bearing offered many difficulties in the manufacture of spindles and contributed in rendering manufacture itself very expensive.

By means of the object of this invention a new type of spindle is created, which is able to displace itself in the simplest manner in any direction and to put itself automatically into the axis of rotation. This mobility in all directions consists in a mobility of the entire supporting fitting of the spindle in regard to the bearing-body, in a mobility of the spindle collar in regard to the bearing-body, to the tube and to the footstep-bearing and finally in the mobility of the spindle collar, the footstep-bearing and the tube among each other.

Figure 3:
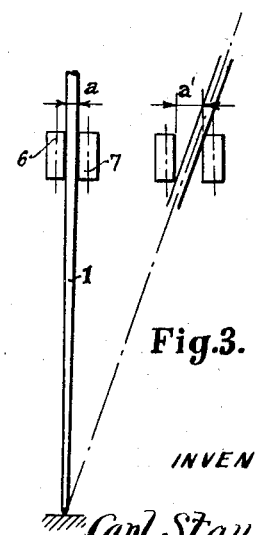

Object of the present application is illustrated in different possible constructions by the attached drawings. By the following figures can be seen Fig. 1 the device, as it was known till now, Fig. 2 an explanatory diagram, Fig. 3 a further explanatory diagram, Fig. 4 a third explanatory diagram, Fig. 5 a construction of the object of the application, Fig. 6 a detail of Fig. 5, Fig. 7 a construction, where the bolster is substituted by the spring itself, Figs. 8 and 9 a particular form of the construction according to Fig. 7, where the diameters of the wire-spirals grow smaller on the lower end, the spirals being located in the oil-receptacle, which can be screwed off.

Figure 5:
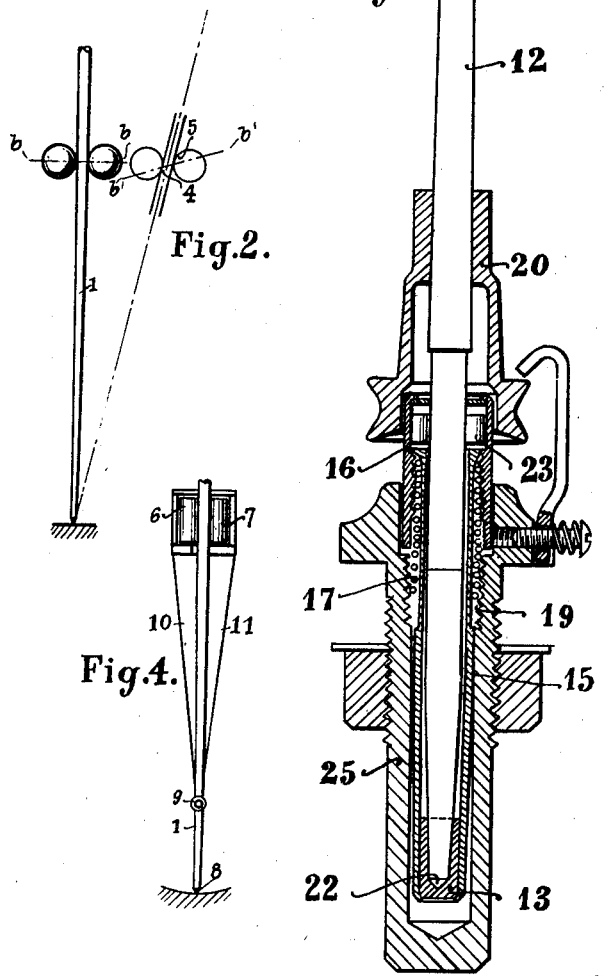
Figure 6:
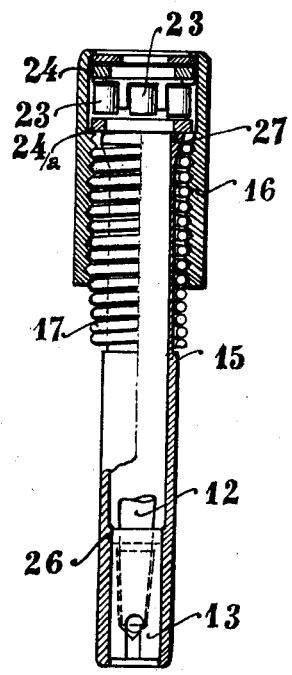

The idea of this invention, which has been already explained by the diagram of Fig. 4, is illustrated in two possible constructions by Figs. 5 and 6. The oscillating supports 10/11 are here substituted by a spiral spring.

Spindle 12 runs on the footstep-bearing 13 and in the collar 14 of the tube 15. Spindle collar 14, which is shaped in form of a roller-bearing, is situated in a cap 16 and is held in place by the spiral spring 18 screwed in the inside-thread 17. The other end of the spiral-spring 18 is screwed in in the inside thread 19 of spindle tube 15, the spring allowing thus collar 14 to move. Cap 16 is partly covered by the wharve sleeve 20 and the wharve 21. When now the spindle is passing through the critical speed, i. e. the speed, at which the axis of the spindle deflects from its original position, a displacement of the collar occurs, while spring 18 is either contracted or extended. The plane of the points of contact between the rollers and the spindle, however, will always intersect the axis of the spindle at a right angle, no matter what the inclination of the axis of the spindle may be. Footstep 22 is thereby not hindered in its motion. A play of some thousandths of millimetre in the footstep-bearing will suffice to allow a shifting to a tolerable limit.

Collar 14 is a roller-bearing consisting in the rollers 23 in the upper-ring 24 and in the lower-ring 24a, on which leans the bolster 15 with its bulb 27. Bolster 15 is pressed against the lower-ring 24a of the roller-bearing by spring 17, the latter having at the same time to play the function of a yielding support for bolster 15 and, by this means, for the spindle revolving in pillar 25. Pillar 25 is then fixed to the spindle rail by a flange and a contre-nut. Cap 16 containing the collar is provided on its lower-end with an inside thread, while the upper portion is inside ground.

Into this upper half of cap 16 ring 24a is brought, upon which rollers 23 and rollercage 28 rest. The whole is then closed by upper-ring 24 and is secured by pressing down cap 16 of the collar. Bolster 15 which is cone-like widened on its upper end 27, leans on the mentioned ring 24a and is pressed against it by spring 17. Footstep 13 is introduced into the lower-end of bolster 15 and, as this lower portion 26 has the shape of a bulb or cone, it can be only brought in from above. Once introduced, it will adjust itself into the right position. The spindle has got lateral play in the footstep bearing in order to enable the shifting of the axis of rotation.

The entire supporting device of the spindle, which can be separately manufactured, is introduced into pillar 25 and is fixed by turning it down. The spirals of spring 17 enter thereby into the inside thread of the pillar. By this arrangement a soft and elastic type of spindle is created, which in a very high degree of flexibility will answer all requirements, as its axis will at any moment occupy the position of the axis of rotation, the spindle being firstly fitted out with a loose neck-bearing or collar, secondly with a bolster, which will be flexible concerning this collar, thirdly with a footstep-bearing, flexible and adjustable to both mentioned parts, and fourthly with a complete spindle holder, which accordingly can be adjusted in any direction. Even intermittent and irregular loads, that may occur, as e. g. if spindles are stopped, when they are held fast on the top—a practice which is generally used by spinners, when they are piecing the broken end or doffing the full bobbins—will never cause any deformation, because the supporting system itself is yielding. For the same reason the inclining of the spindle will never cause deformations, by which a flapping of the spindle may occur. The spindle will always be able to put itself freely into the axis of rotation. Thus, it is not necessary that the axis of the spindle and the axis of rotation have always to coincide. In consequence of that vibrations will certainly be excluded, if this new type of spindle will be used. This new fitting offers very great advantages in regard to its manufacturing, because the centres of both the foot-step as well as the collar will always coincide. This is a feature which until now has never been completely reached.

In the construction illustrated by Fig. 7 bolster 26 is substituted by spring 17, playing here the function of a complete bolster. By this feature the spindle is firstly free to move laterally all around. Secondly shocks which will be transmitted in the direction of the axis of the spindle, when the tube is put on or is removed, are absorbed by the spring.

Spindle 12 having a wharve 21 of the shape of a cup, is supported by the foot-step 13 and guided by the collar 14. Both the collar and the footstep are fitted within the cylindrical spring 17, the latter being connected loose with the pillar by means of the thread cut in the inside of the said pillar. Pillar 25 rests with its flange on the spindle-rail and is fixed to it by a nut.

The collar is from the roller-bearing type. Its cap 16 is provided inside with a thread at its lower-end, while the upper portion is hollowed and ground. Ring 24a, which is also ground, is located in this hollow space and rollers 23 with their edge 28 are resting on this ring. The fitting is closed by ring 24 and is secured by pressing down tube 16 of the spindle collar. This is free to move and is carried on the cylindrical spring 17 only by the thread cut in its lower end.

The cylindrical spring 17 carries footstep 13 also, the latter being allowed freely to follow any shifting of the axis rotation of the spindle 12.

The bolster, which may be separately manufactured, is fitted within the pillar 25. It is fastened to the latter by screwing it down. Spirals of spring 17 engage thereby with the inside thread of pillar 25. By this arrangement a soft and elastic spindle type is created, which in a very high degree of flexibility will answer all requirements, as its axis will at any moment occupy the position of the axis of rotation, the spindle being firstly fitted out with a loose neck-bearing or collar, secondly with a bolster, which will be flexible concerning this collar, thirdly with a footstep bearing, flexible and adjustable to both mentioned parts, and fourthly with a complete spindle holder, which accordingly can be adjusted in any direction. Even intermittent and irregular loads, that may occur, as e. g. if spindles are stopped, when they are held fast on the top—a practice which is generally used by spinners, when they are piecing the broken end or doffing the full bobbins—will never cause any deformation, because the supporting system itself is yielding. For the same reason the inclining of the spindle will never cause deformations, by which a flapping of the spindle may occur. The spindle will always be able to put itself freely into the axis of rotation. Thus, it is not necessary, that the axis of the spindle and the axis of rotation have always to coincide. In consequence of that vibrations will certainly be excluded, if this new type of spindle will be used.

By Figs. 8 and 9 a type of spindle is illustrated, the bolster of which grows narrower against its lower-end, where footsteps 13 is fitted within. By this arrangement it is reached, firstly, that for fastening the spindle supporting device to the tube or pillar only few turns are to be made, e. g. the few threads necessary to secure fastening are to be screwed in. Secondly, the lower part of the bolster will fit within the oil-cup 29, which can be screwed down. The construction of the spindles is very simple. Pillar 25 is in the usual way fastened to the rail by means of flange and nut. Spindle 12 carries almost in the middle the wharve 21 which is shaped like a cup. In the hollow of wharve 21 the collar is located. To prevent the spindle from lifting up from its position, catch 30 is arranged. Pillar 25 is fitted on its lower end with the oil-receptacle 29, which can be screwed on by threads 31. This oil-receptacle consists in the cap 32 and in the sleeve 33, which is fixed firm in the cap by means of the pressure-ring 34. Pillar 25 is provided with the inside thread 19, in which the bolster consisting in wire-spirals is screwed in. The upper part of the pillar is ground and carries the upper supporting device of the spindle, which is located in cap 16. The lower part of the bolster is conical on place 35, becoming then cylindrical again towards the end, where the footstep bearing is arranged. Besides, the decrease in the diameter of the bolster will enable the spindle to fit within the oil-receptacle and the whole supporting device will, by this means be screwed in in very short a time.

Having now particularly described and ascertained the nature of my said invention and in what manner the same is to be performed, I declare that what I claim is:—

1. A device of the character described comprising a spindle, a bolster about one end of said spindle, a step bearing supporting the inner end of the spindle within the bolster, a roller bearing associated with the outer end portion of said spindle, a cap enclosing said roller bearing, and a coil spring carried by said cap and connected to the bolster, said spring being adapted to hold in place the collar bearing and step bearing upon the spindle and to elastically and flexibly press the bolster and step bearing against the collar bearing.

2. A device of the character described comprising a spindle, a bolster about one end of the spindle, a step bearing supporting the inner end of the spindle within the bolster, a roller bearing associated with the outer end portion of said spindle, a cap enclosing said roller bearing and having a portion extended over the bolster, said extended portion of the cap being internally screw threaded, and a coil spring having one end in engagement with the screw threaded portion of the cap and the opposite end connected to the bolster whereby to hold in place the collar bearing and step bearing upon the spindle and to elastically and flexibly press the bolster and step bearing against the collar bearing.

3. A device of the character described comprising a spindle, a collar bearing and step bearing for the spindle, a cap enclosing said collar bearing and a spring carried by said cap and engaging the foot-step thereby yieldably connecting said collar bearing and step bearing, said spring forming a bolster about the inner end of the spindle and yieldably holding the collar bearing and step bearing in place upon the spindle, and the lower end of the spring forming the bolster being gradually reduced to facilitate the introduction and removal of the spindle step bearing.

4. A device of the character described comprising a spindle, a collar bearing and a step bearing for the spindle, a coil spring having one end in engagement with the collar bearing and the opposite end disposed to act upon the step bearing for yieldably connecting the latter to the collar bearing, and a pillar receiving said spring and supporting the same together with the spindle and its collar bearing and step bearing, said pillar having an internal screw threaded portion for engagement with said coil spring.

In witness whereof I have hereunto set my hand.

CARL STAUFERT.